(No Model.)

M. KENNEDY.
DIE FOR SHAPING NUT BLANKS.

No. 370,066. Patented Sept. 20, 1887.

UNITED STATES PATENT OFFICE.

MARTIN KENNEDY, OF HEGEWISCH, ILLINOIS, ASSIGNOR, BY MESNE AS-
SIGNMENTS, TO THE UNITED STATES ROLLING STOCK COMPANY.

DIE FOR SHAPING NUT-BLANKS.

SPECIFICATION forming part of Letters Patent No. 370,066, dated September 20, 1887.

Application filed February 18, 1887. Serial No. 228,069. (No model.)

*To all whom it may concern:*

Be it known that I, MARTIN KENNEDY, of Hegewisch, in the county of Cook and State of Illinois, have invented a certain new and useful Improvement in Machines for Making Nuts, of which the following is a full, clear, and exact description.

My invention is designed for the production of square nuts and washers and forming or embossing similar objects which may have either plane or beveled faces.

My invention consists in the peculiar construction and combinations of the fixed die, moving die, shearing-blade, and punch, so that a single reciprocating motion applied to the punch actuates all the moving parts of the device, producing washer, nut, or other blanks from the bar, and so that the several parts of which the dies are composed shall be simple in shape, easily made, adjusted, and repaired.

Figure 1:
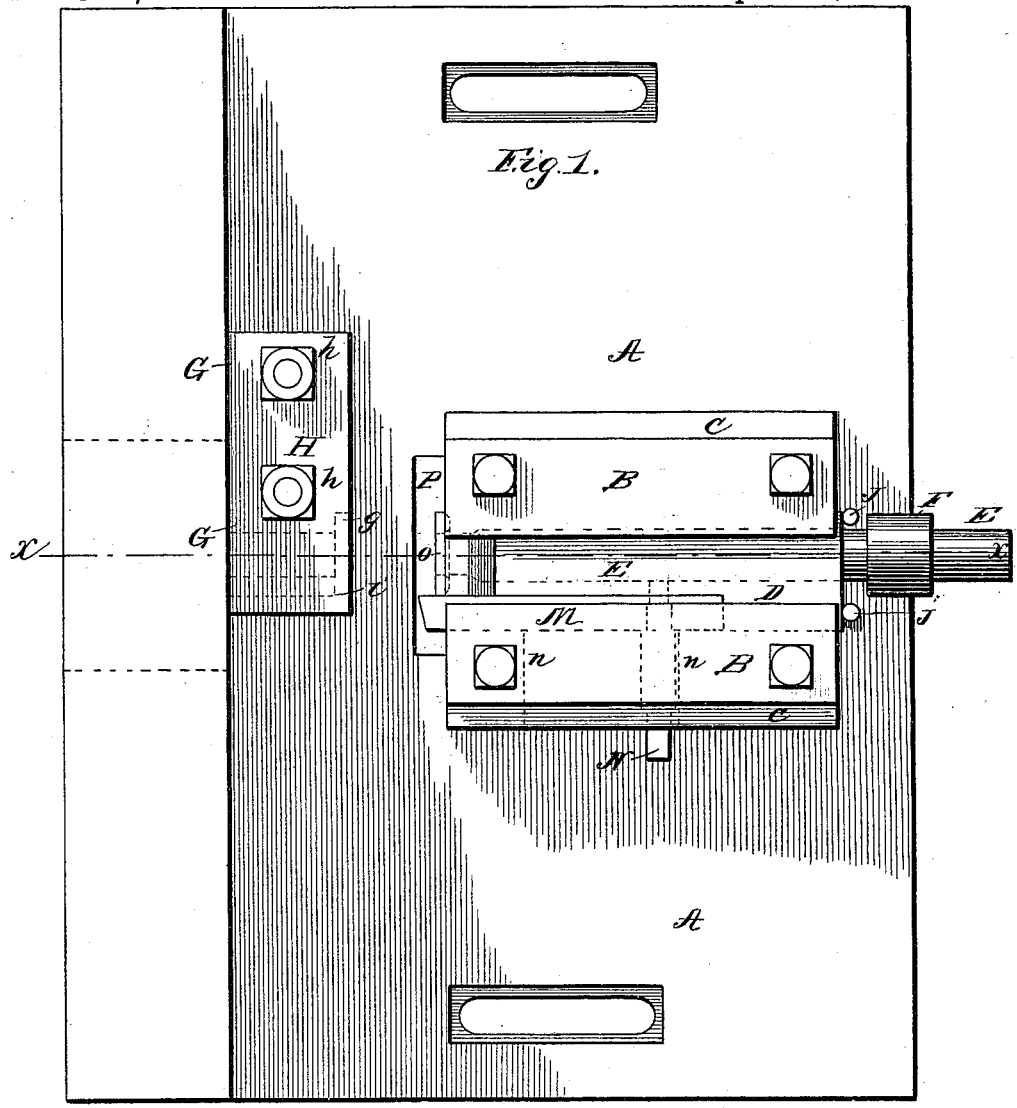
Figure 2:
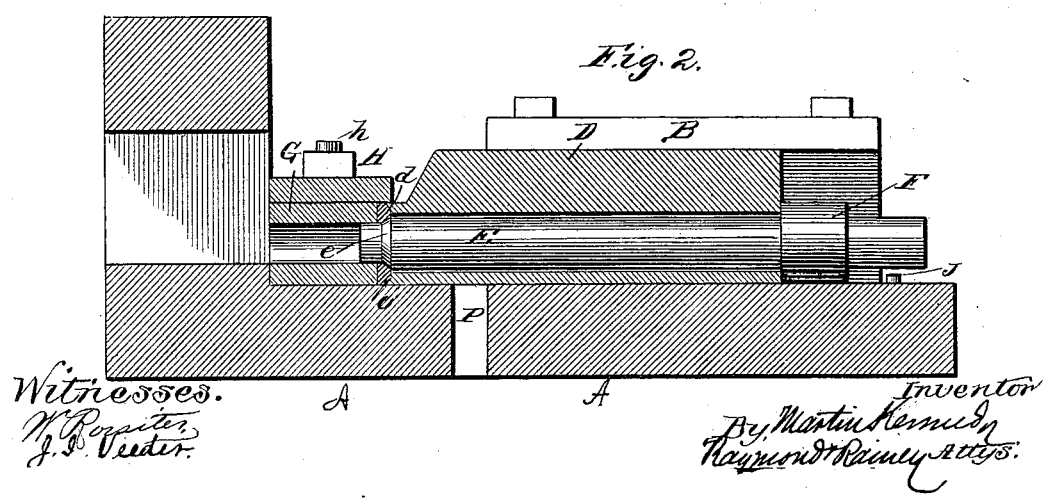

In the drawings, Figure 1 is a plan of so much of the machine as is necessary to illustrate my invention. Fig. 2 is a section on line *x x*, Fig. 1.

Secured to the bed A, by bolts *h h*, is the fixed die, composed of the plate H and the block G, the latter being cross-planed and drilled, as indicated by the dotted lines. (*Vide* Fig. 1.) A recess, *g i*, is thus formed of the size of the exterior of the nut or washer to be made. The edge *i* of the block G forms the fixed cutting-blade, against which the moving blade acts in severing the blank from the bar. If desired to operate only upon blanks previously prepared and cut to the right size, the die D without the blade M, but combined with the punch E, substantially as herein described, may be used.

E is a punch, which receives a reciprocating movement from any suitable source. It slides freely in the block D, the extent of its motion in said block being limited by the collar F. It is not essential that the punch E should be located entirely within the die D, though that is the most convenient form, and the form in which I have practiced my invention; but the punch may be combined with the die D on either side thereof. The block D, sliding in the recess formed by guides C C and gibs B B, derives its motion from the punch E. Its motion is limited by the stops J. The moving shear-blade M is attached to the block D by the screw N. The dotted lines *n n* indicate a slot in which the screw N may move. The punch E and block D are shaped as shown at *e* and *d*, if it is desired to bevel the face of the washer or nut O.

The operation is as follows: The machine being in the position shown in Fig. 1, a bar of the width and thickness of the nut to be made is placed in the fixed die G H, with its end abutting against the shoulder *g*, which thus forms a gage. The advance of the punch E, and with it the block D and its attached shear M, severs the part of the bar within the die G H from the remainder, and at the same time punches the hole through the nut. The continued advance of the punch E and block D bevels the face of the nut, its distortion or splitting being prevented by the surrounding sides of the die G H and the shear-blade M. The face of the die D may be of any desired form or shape for the purpose of embossing or otherwise shaping the blank to be operated upon. The retraction of the punch E carries with it the nut O and block D until the latter strikes the stop J, when the punch is withdrawn from the nut, which drops through the opening P.

By my construction I have dispensed with gages for measuring the amount of stock to be cut off to form the blank, the die forming its own gage. The nut while being shaped is surrounded on three of its edges by the three fixed sides of the die G H, the blade M, firmly secured to the movable die, forming the fourth side. The chances of producing sharp edges or "fins" upon the nut is thus reduced to a minimum. The central punch, E, and the block D have a single source of motion, thus reducing the number of parts materially. The fixed die consists of but two pieces, both easily made, and the moving parts are reduced to the smallest possible number.

The combination of the movable die D with the stops J J and the punch or cutting-tool E, either with or without the collar, flange, or spur F, would come within my invention, this part of my invention having for its object the automatic releasing of the blank from the tool after the work has been done by the contact of the die with said stops and the continued withdrawal of the tool.

I claim—

1. In nut-blank machines, the combination of the fixed die, open as to one of its sides, the edge of which forms the fixed blade of the shear for cutting the blanks from the bar, and the movable die carrying a blade and having a punch sliding within it, the movable die receiving its motion from the punch, and the fixed die having three fixed sides, and its fourth open side being closed by the advance of the movable shear-blade, all arranged and constructed substantially as described.

2. The combination of the fixed die having the recess $g\ i$, the movable die having the blade M, the tool E, having the collar, flange, or spur F, and the stops J J.

MARTIN KENNEDY.

Witnesses:
F. O'MEARA,
GEO. A. SAMONSKI.